United States Patent [19]
Maurer

[11] Patent Number: 5,854,827
[45] Date of Patent: Dec. 29, 1998

[54] PROCESS FOR ACTIVATING A MAILBOX MESSAGE NOTIFICATION IN A COMMUNICATIONS TERMINAL

[75] Inventor: Gerald Maurer, München, Germany

[73] Assignee: Siemens Aktiengesellschaft, Munich, Germany

[21] Appl. No.: 732,298
[22] PCT Filed: Apr. 18, 1995
[86] PCT No.: PCT/DE95/00534
   § 371 Date: Oct. 29, 1996
   § 102(e) Date: Oct. 29, 1996
[87] PCT Pub. No.: WO95/30299
   PCT Pub. Date: Nov. 9, 1995

[30] Foreign Application Priority Data

Apr. 29, 1994 [DE] Germany .......................... 44 15 168.3

[51] Int. Cl.⁶ .................................................. H04M 1/64
[52] U.S. Cl. ..................................... 379/88.02; 379/88.19
[58] Field of Search .................................. 379/67, 88, 89, 379/34, 35, 37, 40, 41, 45, 88.12, 88.11, 88.19, 88.2, 88.21

[56] References Cited

U.S. PATENT DOCUMENTS 4,585,906  4/1986  Matthews et al. ...................... 379/88
5,195,126  3/1993  Carrier et al. ............................ 379/45

FOREIGN PATENT DOCUMENTS 0 588 101 A2  3/1994  European Pat. Off. .
41 24 711 A1  1/1993  Germany .
WO 87/07801  12/1987  WIPO .
WO 91/03118  3/1991  WIPO .
WO 92/22883  12/1992  WIPO .

OTHER PUBLICATIONS

IBM Technical Disclosure Bulletin, vol. 36, No. 068, (1993), Sure Bulletin, Operating System Termination via Telephone Criteria Reminder, pp. 249–250.

Siemens ISDN in the Office –HICOM, German version of the specification, pp. 76–79 and corresponding English version of the specification, pp. 73–76.

*Primary Examiner*—Daniel S. Hunter
*Attorney, Agent, or Firm*—Hill & Simpson

[57] ABSTRACT

A number of messages are stored in an electronic mailbox of a communications system. When a call is made to this mailbox, the calling-party subscriber extension call number which is transmitted during the connection set-up is checked for assignment to the stored messages. A mailbox message notification at a communications terminal is activated only if an assignment can be detected. Thus, notification of events is supported via a communications system.

6 Claims, 2 Drawing Sheets

PROCESS FOR ACTIVATING A MAILBOX MESSAGE NOTIFICATION IN A COMMUNICATIONS TERMINAL

BACKGROUND OF THE INVENTION

The invention relates to a process for activating a mailbox message notification in accordance with the preamble of patent claim 1.

Different communications systems are known, which, in addition to the actual switching control, are also capable of controlling and/or implementing additional procedures which go beyond the actual switching functions. Such additional functions are generally referred to as performance features, a large number of different performance features being known here in particular for the "voice" communications service.

Such a communications system is known from a telcom report and Siemens-Magazine COM "ISDN im Büro", Siemens Aktiengesellschaft, Berlin and Munich, 1985, in particular pages 76 to 79, the said communications system providing a call answering function or voice information service.

The absence of a subscriber when a call is made leads to the call being diverted to an electronic mailbox. The caller then receives a recorded message from the absent called subscriber and can leave a message himself—a voice message within the context of the voice information service—in the electronic mailbox.

As soon as a message has been stored in a mailbox, a mailbox message notification, for example in the form of a signal lamp, is activated at the communications terminal of the called subscriber. By means of this communications terminal, the called subscriber can call up the messages stored in the mailbox, at any desired time.

As a supplement to this, notification function has also already been proposed which is intended to serve to pass on the mailbox message notification to other communications terminals, in a way analogous to diverting a call, which can be selected by means of their extension call number.

U.S. Pat. No. 5,195,126 discloses a process for outputting messages, stored in a mailbox, to a terminal. An item of identification information, originating from the calling subscriber, is transmitted to a control of the mailbox and compared with the mailbox number of the calling subscriber. In the case of correspondence, a connection is set up to one or more terminals and the message stored in the corresponding mailbox is transmitted to the terminals.

SUMMARY OF THE INVENTION

The present invention is based on the object of providing supportive measures in a communications system for the notification of events via the said communications system.

In general terms the present invention is a process for activating a mailbox message notification at a communications terminal of a communications system having at least one electronic mailbox for storing messages which can be issued at the communications terminal. A respective item of individual identifier information is assigned to each message. In the course of a connection set-up to the electronic mailbox, an item of identification information is transmitted to the controller of the electronic mailbox. The identification information is compared by the controller with the individual items of identifier information of the messages stored in the electronic mailbox. The mailbox message notification is activated only when correspondence occurs.

Advantageous developments of the present invention are as follows.

When there is a lack of correspondence of the identification information with each of the individual items of identifier information, a message which indicates that the electronic mailbox has been disabled from receiving messages is transmitted from the controller to the subscriber extension which bring about the connection set-up.

The extension call number of the subscriber extension which brings about the connection set-up is provided as identification information.

When correspondence occurs, the respective message is marked as newly arrived.

When correspondence occurs, the respective message is provided with an item of time information which includes the present time of day.

The process is used in a communications system having an activatable notification function which provides a mailbox message notification at communications terminals of subscriber extensions which can be selected by extension call numbers.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

A call at a specific electronic mailbox, in particular voice mailbox, causes a message which has already been stored in the mailbox and listened to and which can be assigned to the caller by means of his call number to be marked as newly arrived and provided with an updated "time stamp". The owner of the mailbox is notified of the arrival of the call or of the occurrence of an event by the activated mailbox message notification on his communications terminal.

Using a notification function which is implemented in the communications system and in which a mailbox message notification is passed on in a way analogous to diverting a call, it is possible for the owner of the mailbox to be informed of the fact that a call has been received (by specifying target call numbers) at subscriber extensions, i.e. communications terminals, which can be freely selected by him.

Callers to which no message stored in the mailbox can be assigned are notified that messages cannot be received in this specific mailbox. This ensures that only events which are foreseen by the owner of the mailbox are accepted and trigger a mailbox message notification.

The process according to the invention or its developments is particularly suitable if any events, e.g. machine failures, which can trigger a telephone call (e.g. via relays) are to be reported automatically in detailed form to variable targets via the communications network (in particular telephone network), radio paging devices or mobile radio devices.

Figure 1:
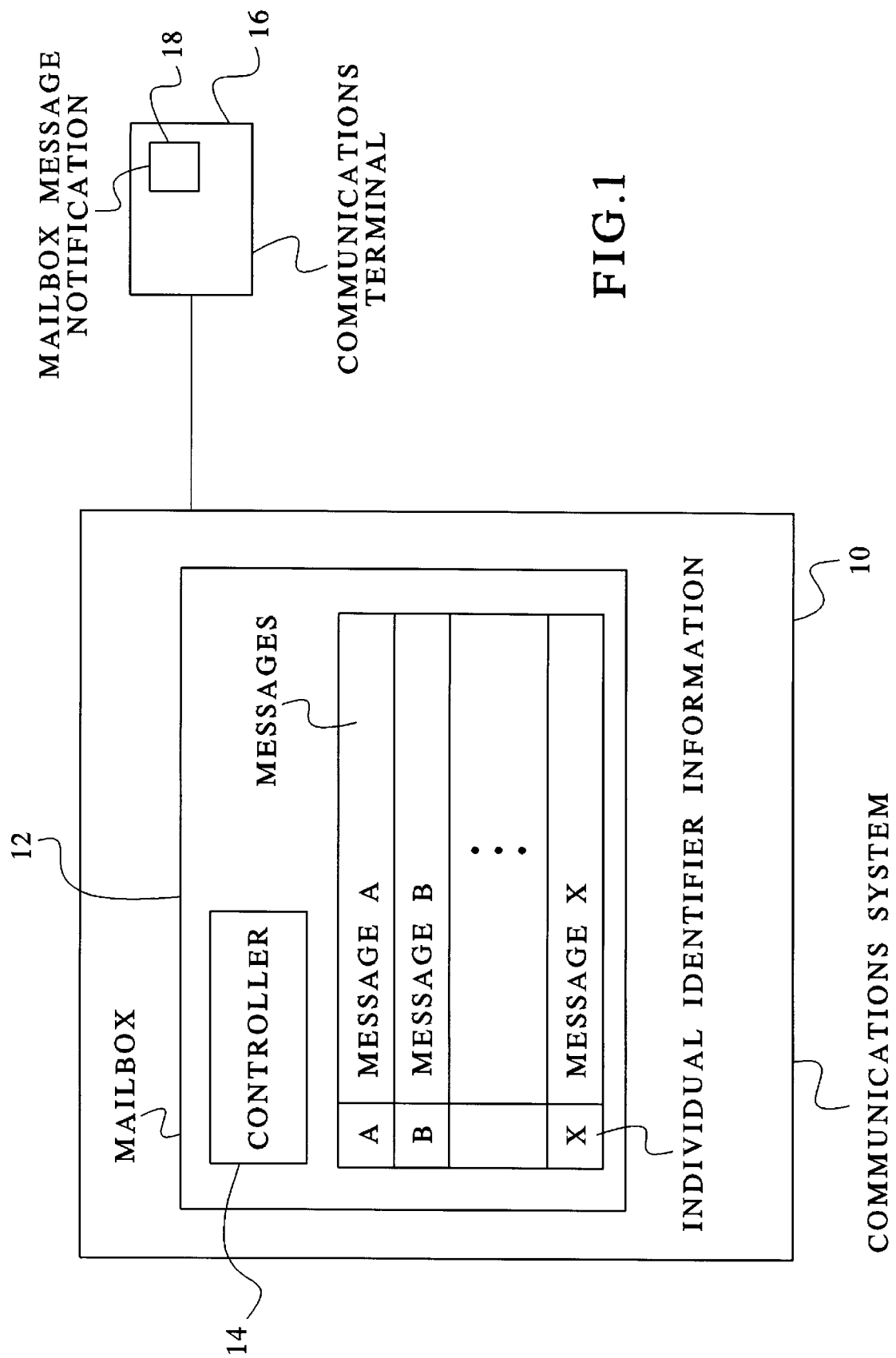
FIG. 1 schematically depicts the process of the present invention.
Figure 2:
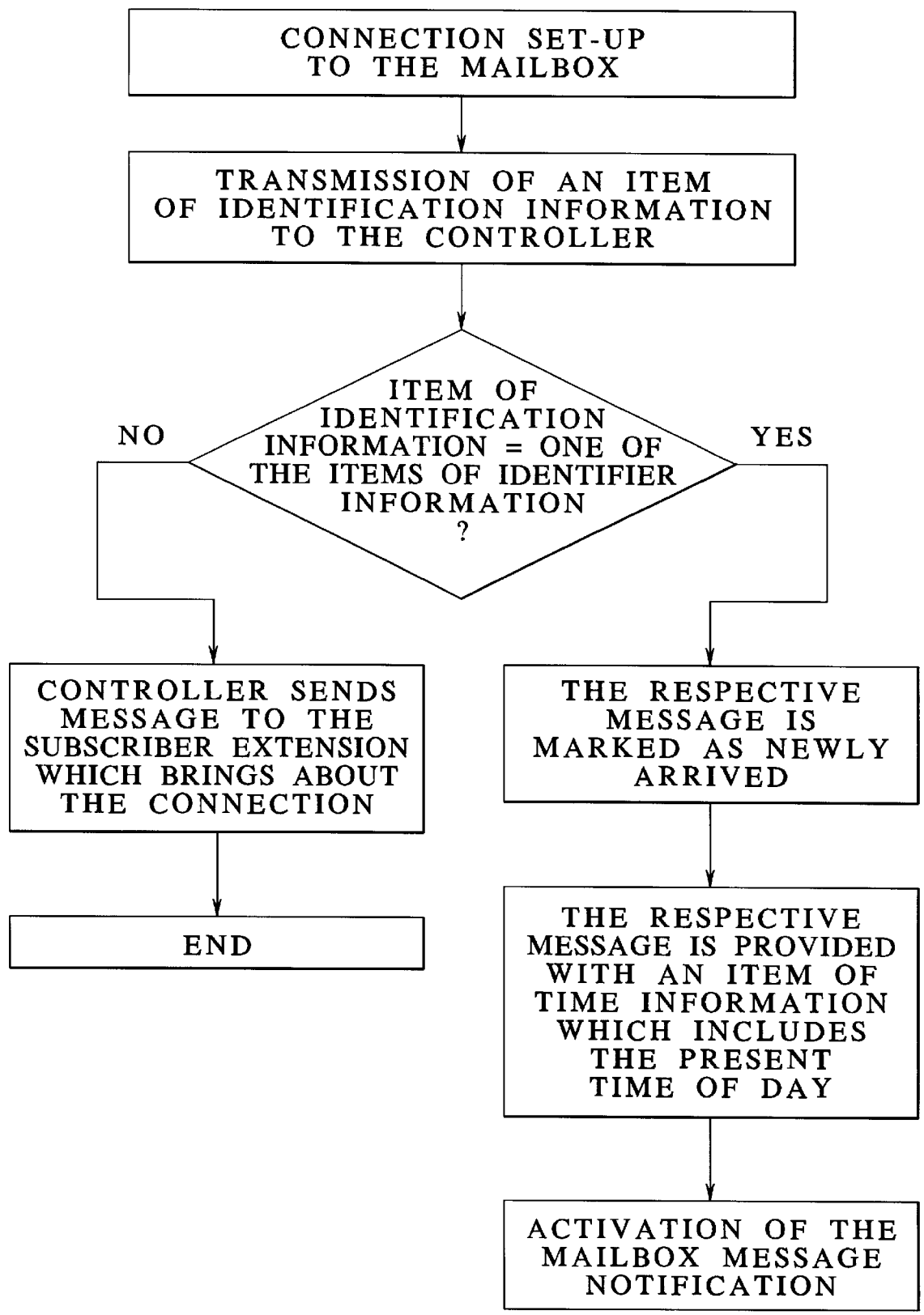
FIG. 2 is a flow-chart of the process of the present invention.

Figure one schematically depicts the communication system 10 having a mailbox 12. The mailbox 12 has a controller 14 and messages (message A–message X) with individual identifier information (A–X). The communication system 10 is operatively connected to a communications terminal 16 having a mailbox message notification 18. FIG. 2 is a flow-chart of the process of the present invention as described above.

With the process according to the invention, for example centralized monitoring of a plurality of machines can be realized by one monitoring person. In the event of a machine failure, a connection set-up to the electronic mailbox assigned to the monitoring person can be brought about at the subscriber extension assigned to the respective machine. In the course of the connection signaling, the mailbox is also informed of the call number of the subscriber extension at which the call, that is to say the connection set-up, has been brought about.

In this mailbox, in each case one message is stored for each machine to be monitored. Using the transmitted extension call number, the message which is assigned to the failed machine is selected. This message is marked as newly arrived and is provided with an updated time stamp. Furthermore, the mailbox message notification is activated at the communications terminal of the monitoring person.

The activated mailbox message notification informs the monitoring person that one of the machines has failed. By calling up the messages which are marked as newly arrived, the monitoring person receives at his communications terminal the further information as to which of the machines has been affected by the failure and at what time this failure occurred. As soon as all the messages marked as new have been issued, the mailbox message notification is cleared again.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for activating a mailbox message notification at a communications terminal of a communications system having at least one electronic mailbox for storing messages which can be issued at the communications terminal, comprising:

respectively assigning an item of individual identifier information to each message stored in the electronic mailbox;

transmitting during a connection set-up to the electronic mailbox, an item of identification information to the controller of said electronic mailbox;

comparing the transmitted identification information by the controller with individual items of identifier information of messages stored in the electronic mailbox; and activating the mailbox message notification, for acceptance of a respective stored message at an arbitrary point in time, only when correspondence occurs between the transmitted identification information and identification information of a stored message, the correspondence being a result of said comparing.

2. The process as claimed in claim 1, wherein an extension call number of a subscriber extension which brings about the connection set-up is provided as identification information.

3. The process as claimed in claim 1, wherein, when correspondence occurs, the respective message corresponding to the transmitted identification information is marked as newly arrived.

4. The process as claimed in claim 1, wherein, when correspondence occurs, the respective message corresponding to the transmitted identification information is provided with an item of time information which includes present time of day.

5. The process as claimed in claim 1, wherein the communications system has an activatable notification function which provides a mailbox message notification at communications terminals of subscriber extensions which are selectable by extension call numbers.

6. A process for activating a mailbox message notification at a communications terminal of a communications system having at least one electronic mailbox for storing messages which can be issued at the communications terminal, comprising:

respectively assigning an item of individual identifier information to each message stored in the electronic mailbox;

transmitting during a connection set-up to the electronic mailbox, an item of identification information to the controller of said electronic mailbox;

comparing the transmitted identification information by the controller with individual items of identifier information of messages stored in the electronic mailbox;

activating the mailbox message notification, for acceptance of a respective stored message at an arbitrary point in time, only when correspondence occurs between the transmitted identification information and identification information of a stored message, the correspondence being a result of said comparing; and transmitting, when there is a lack of correspondence of the transmitted identification information with each of the individual items of identifier information of the stored messages, a message, which indicates that the electronic mailbox has been disabled from receiving messages, from the controller to a subscriber extension which brings about the connection set-up.

* * * * *